United States Patent
Yamamoto et al.

(10) Patent No.: US 10,071,731 B2
(45) Date of Patent: Sep. 11, 2018

(54) PARKING ASSIST APPARATUS

(71) Applicant: FUJITSU TEN LIMITED, Kobe-shi, Hyogo (JP)

(72) Inventors: Chiharu Yamamoto, Kobe (JP); Masashi Tsuyunashi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 11 days.

(21) Appl. No.: 15/381,584

(22) Filed: Dec. 16, 2016

(65) Prior Publication Data
US 2017/0183001 A1 Jun. 29, 2017

(30) Foreign Application Priority Data
Dec. 25, 2015 (JP) ................. 2015-253558

(51) Int. Cl.
| | | |
|---|---|---|
| *B60W 30/00* | (2006.01) | |
| *B60W 30/06* | (2006.01) | |
| *G05D 1/00* | (2006.01) | |
| *G08G 1/16* | (2006.01) | |
| *G05D 1/02* | (2006.01) | |
| *G08G 1/0962* | (2006.01) | |

(52) U.S. Cl.
CPC ........... *B60W 30/06* (2013.01); *G05D 1/0022* (2013.01); *G05D 1/021* (2013.01); *G08G 1/0962* (2013.01); *G08G 1/168* (2013.01)

(58) Field of Classification Search
CPC ...... B60W 30/00; B60W 30/06; B60W 50/00; B60W 50/14; G08G 1/00; G08G 1/0962; G08G 1/162; G08G 1/14; G08G 1/141; G08G 1/145–1/147; B62D 15/00; B62D 15/27; G05D 1/00
See application file for complete search history.

(56) References Cited

U.S. PATENT DOCUMENTS

| | | | | |
|---|---|---|---|---|
| 5,797,134 A | * | 8/1998 | McMillan .......... | G06Q 30/0283 705/4 |
| 8,339,253 B2 | * | 12/2012 | Chundrlik, Jr. ........... | B60R 1/00 340/435 |
| 8,816,878 B2 | * | 8/2014 | Kadowaki .......... | B62D 15/0285 340/438 |

(Continued)

FOREIGN PATENT DOCUMENTS

| | | |
|---|---|---|
| JP | 2007198855 A | 8/2007 |
| JP | 2007237930 A | 9/2007 |

(Continued)

*Primary Examiner* — Yonel Beaulieu
(74) *Attorney, Agent, or Firm* — Oliff PLC

(57) ABSTRACT

In a case where an actual parking technique of a driver in a parking condition is different from a parking technique shown by a parking technique model generated in a same parking condition, a parking assist apparatus outputs a question to the user about whether or not assistance for the parking operation is desired to park the vehicle. In a case where the driver accepts the assistance for the parking operation, the parking assist apparatus provide the assistance for the parking operation to park the vehicle. Thus, useless parking assistance that the driver does not desire can be prevented, and parking assistance that is truly desired by the driver can be executed.

19 Claims, 11 Drawing Sheets

(56) References Cited

U.S. PATENT DOCUMENTS

| | | | |
|---|---|---|---|
| 8,947,260 B2* | 2/2015 | Fukushima | G08G 1/0175 180/199 |
| 9,135,580 B1* | 9/2015 | Lyman | G06Q 10/02 |
| 9,384,664 B2* | 7/2016 | Torii | G08G 1/168 |
| 9,477,227 B2* | 10/2016 | Hahne | B60W 30/09 |
| 2004/0119610 A1* | 6/2004 | Maemura | B60Q 9/005 340/932.2 |
| 2008/0065293 A1* | 3/2008 | Placke | B60K 31/0008 701/41 |
| 2010/0114438 A1* | 5/2010 | Makino | B60R 1/00 701/48 |
| 2010/0118140 A1* | 5/2010 | Iwakiri | B60R 1/00 348/135 |
| 2010/0283632 A1* | 11/2010 | Kawabata | B62D 15/027 340/932.2 |
| 2011/0080304 A1* | 4/2011 | Toledo | B62D 15/027 340/932.2 |
| 2012/0191284 A1* | 7/2012 | Fehse | B62D 15/0275 701/23 |
| 2013/0073119 A1* | 3/2013 | Huger | B62D 15/027 701/1 |
| 2013/0222157 A1* | 8/2013 | Fukushima | G08G 1/0175 340/932.2 |
| 2016/0012726 A1* | 1/2016 | Wang | G08G 1/0112 340/932.2 |
| 2016/0068187 A1* | 3/2016 | Hata | B62D 15/0285 701/41 |
| 2017/0028985 A1* | 2/2017 | Kiyokawa | B62D 15/0285 |
| 2017/0129486 A1* | 5/2017 | Nakada | B60W 30/06 |
| 2017/0309184 A1* | 10/2017 | Nordbruch | G08G 1/146 |

FOREIGN PATENT DOCUMENTS

| | | |
|---|---|---|
| JP | 2008243015 A | 10/2008 |
| JP | 2009002891 A | 1/2009 |
| JP | 2009090927 A | 4/2009 |
| JP | 2009159241 A | 7/2009 |
| JP | 2009286211 A | 12/2009 |
| JP | 2009294790 A | 12/2009 |
| JP | 2013180684 A | 9/2013 |
| JP | 2014125195 A | 7/2014 |

* cited by examiner

| | 103b | | 103a |
|---|---|---|---|
| | PARKING CONDITION DATA | | PARKING TECHNIQUE MODEL |
| D1 | PARKING LOT TYPE | PARKING LOT OF SHOPPING MALL | BACKWARD MOVING AND LEFTWARD TURNING |
| D2 | DRIVER INFORMATION (GENDER) | MALE | |
| D3 | DRIVER INFORMATION (AGE) | 50S | |
| D4 | DRIVER INFORMATION (EXPERIENCE) | SKILLED | |
| D5 | TIMES OF A DAY | EVENING | |
| D6 | PASSENGERS NUMBER | TWO | |
| D7 | PEDESTRIANS NUMBER | FIFTEEN | |
| D8 | PARKING SPACE PA FACING DIRECTION | ORTHOGONAL | |
| D9 | ONCOMING VEHICLE | NONE | |
| D10 | SUBSEQUENT VEHICLE | PRESENCE | |
| D11 | TRAVELLING DIRECTION | STRAIGHT AHEAD | |

FIG.6

PARKING ASSIST APPARATUS

BACKGROUND OF THE INVENTION

Field of the Invention

The invention relates a technology relating to parking assistance for a vehicle.

Description of the Background Art

Conventionally, parking assist apparatuses have been generally known that assist a driver of a vehicle in parking operation by automatically controlling a steering wheel and the like, to park the vehicle in a parking space. Moreover, parking assist systems have been introduced in the society that accumulate past parking operations of drivers for each parking lot to execute a parking operation most appropriate for the driver in a parking lot based on the accumulated information of the parking operations. By using such parking assistance, it is possible to accurately and easily park a vehicle even in a case of parallel parking that requires some steering wheel operations and even in a case of a parking space with a small distance to an adjacent vehicle. Those parking assist technologies are very useful especially for beginner drivers and elderly drivers.

However, such parking assistance is executed whenever the driver moves a gearshift to a reverse (back) position. In a case where the driver determines to drive and park the vehicle himself/herself, such parking assistance is unnecessary. Therefore, some drivers feel that such parking assistance is troublesome, and deactivate the parking assist apparatus. Thus, it is recommended that such parking assistance should be executed only when the driver truly desires to use the parking assistance, such as a case where the driver cannot park the vehicle smoothly.

SUMMARY OF THE INVENTION

According to one aspect of the invention, a parking assist apparatus that assists a parking operation to park a vehicle includes a microcomputer configured to: acquire a parking technique model that shows a parking technique that is determined in accordance with a parking condition of the vehicle; determine whether or not an actual parking technique being used by a user of the vehicle to park the vehicle is different from the parking technique shown by the parking technique model; output a question to the user about whether or not assistance for the parking operation is desired to park the vehicle in a case where the actual parking technique of the user is different from the parking technique shown by the parking technique model; and provide parking assistance for the parking operation to park the vehicle in a case where the user accepts the assistance for the parking operation.

Thus, in the case where the user accepts the assistance, the assistance is provided for the parking operation to park the vehicle. Therefore, useless assistance for the parking operation can be prevented.

According to another aspect of the invention, the microcomputer is further configured to: collect the parking technique used by the user to park the vehicle in a parking lot; and generate the parking technique model based on the collected parking technique and based on a type of the parking lot in which the parking technique has been performed to park the vehicle.

Thus, the user of the vehicle can use the appropriate parking technique model because the parking technique model is generated based on the actual parking technique and on the type of the parking lot.

Thus, an object of the invention is to provide a technology that appropriately assists the driver in parking operation.

These and other objects, features, aspects and advantages of the invention will become more apparent from the following detailed description of the invention when taken in conjunction with the accompanying drawings.

BRIEF DESCRIPTION OF THE DRAWINGS

FIG. 6 illustrates an example of a parking technique model;

DESCRIPTION OF THE EMBODIMENTS

Embodiments of the invention will be described below with reference to the drawings.

<1. First Embodiment>

<1-1. Outline>

Figure 1:
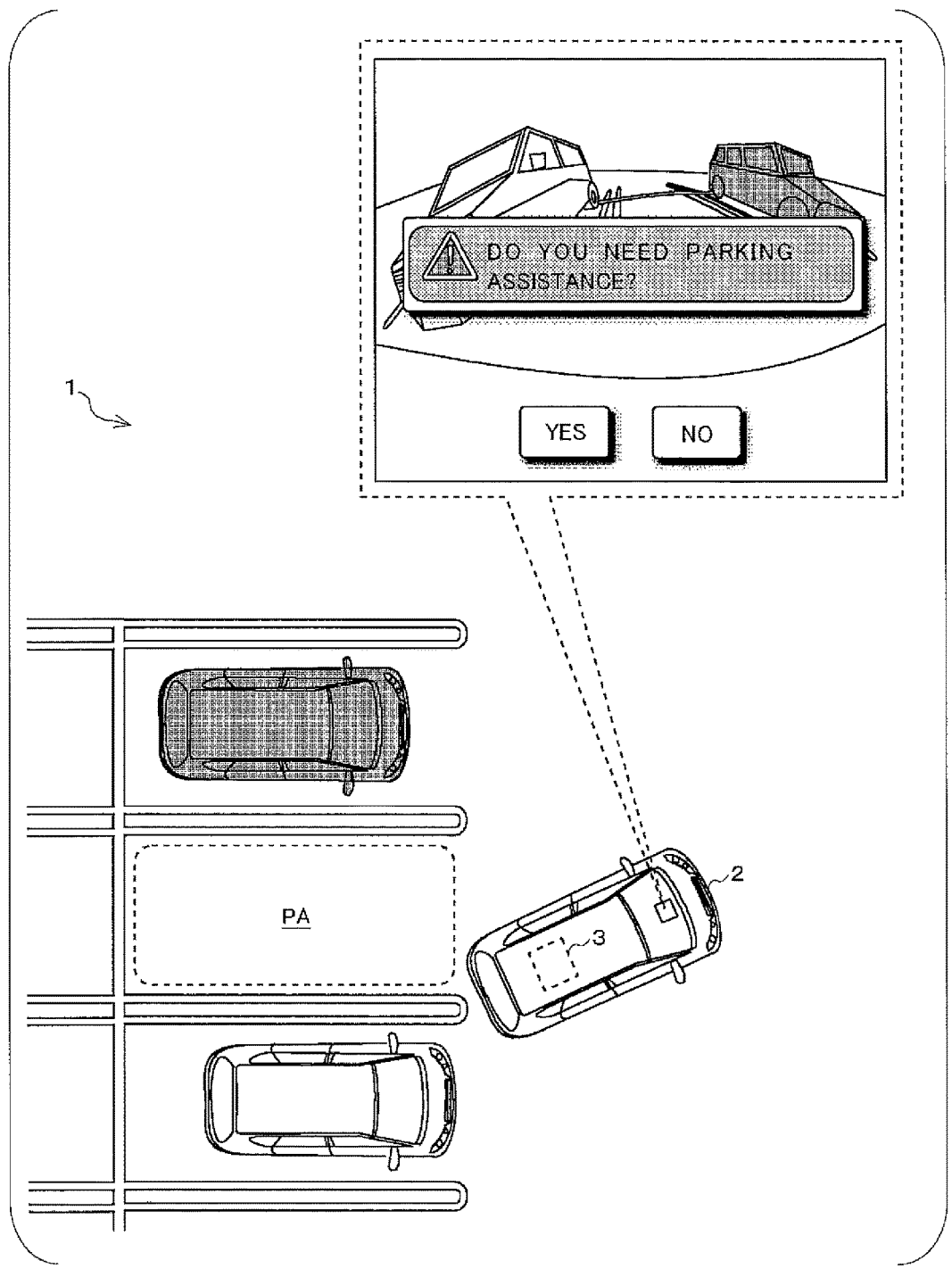
FIG. 1 illustrates an outline of a parking assist system.

FIG. 1 illustrates an outline of a parking assist system 1. The parking assist system 1 assists a driver (user) of a vehicle 2 in properly parking the vehicle 2 into a parking space PA.

Parking assistance means providing instructions to the driver about operations of a steering wheel, an accelerator, etc, by an indicator, voice, etc., when the driver parks the vehicle 2 into the parking space PA. The driver operates the steering wheel and the like, following the instructions by the indicator and the like to accurately and easily park the vehicle 2 into the parking space PA. Especially, for example, even in a case where the driver has little experience of driving a vehicle, a case where the parking space PA is narrow or a case where the driver has poor visibility in a vicinity of the parking space PA, for example, at night, the driver can safely park the vehicle 2 into the parking space PA.

However, some drivers do not necessarily need the parking assistance in a familiar parking lot and the like. In this case, if the parking assist system 1 lights the indicator or outputs the voice whenever the vehicle 2 enters the parking lot, the parking assist system 1 is only a troublesome system for the drivers who do not desire to use the parking assistance.

It is expected that the parking assistance will be executed when the driver truly desires to use the parking assistance, such as when the driver is struggling with a parking operation. In other words, in a case where an actual parking technique that the driver is performing (or using) is different from a generally-used parking technique or an ideal parking technique, the parking assist system 1 timely executes the parking assistance by outputting a question to the driver about whether or not the driver needs the parking assistance.

Figure 2:
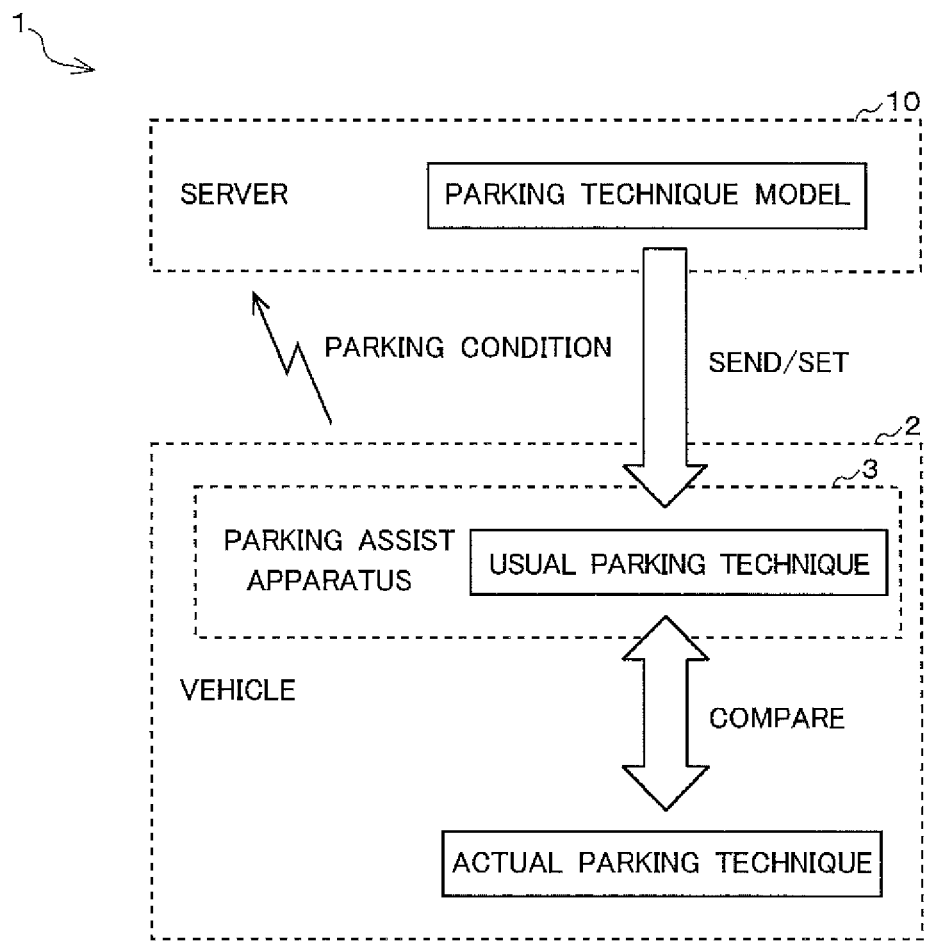
FIG. 2 illustrates a method of determining whether or not parking assistance is necessary.

FIG. 2 illustrates a method of determining whether or not the driver desires to use the parking assistance, for example, when the driver is struggling with the parking operation.

When the vehicle 2 enters a parking lot, a parking assist apparatus 3 sends, to a server 10, parking condition, such as a type of the parking lot (shopping mall, service area, etc.) and times of a day.

The server 10 selects a parking technique model most appropriate to the parking condition sent from the parking assist apparatus 3, and sends the parking technique model to the parking assist apparatus 3. The parking technique model is a model of driving procedure showing the generally-used parking technique or the ideal parking technique under the parking condition in which the vehicle 2 is. For example, model data, such as "backward moving and leftward turning" is input. The server 10 has collected beforehand actual parking techniques in various types of parking condition, from vehicles including the parking assist apparatus 3, to generate and accumulate a plurality of the parking technique models. Thus, if the vehicle 2 is in any parking condition, the server 10 selects one parking technique model appropriate to the condition and sends the selected parking technique model to the parking assist apparatus 3.

Once receiving the parking technique model sent from the server 10, the parking assist apparatus 3 sets the received parking technique model as a "usual parking technique" for the parking assist apparatus 3. In other words, the parking assist apparatus 3 recognizes the parking technique model as the generally-used parking technique or the ideal parking technique.

The parking assist apparatus 3 detects the actual parking technique that the driver is actually performing, and then compares the detected actual parking technique to "the usual parking technique," i.e. the parking technique model. Then, the parking assist apparatus 3 determines a degree of difference between the two techniques. In a case where the degree of the difference is greater than a predetermined level, the parking assist apparatus 3 determines that the actual parking technique of the driver is far from the generally-used parking technique or the ideal parking technique, i.e., that the driver is struggling with the parking operation. In such a case, the parking assist apparatus 3 timely executes the parking assistance by outputting the question about whether or not the driver needs the parking assistance.

Assisting the driver in the parking operation (parking technique) by the parking assist apparatus 3 will be described as "parking assistance" below. Moreover, driving, especially parking, the vehicle 2 by the parking assist apparatus 3 without any operation of the driver will be described as "autonomous driving" below. Further, "leftward turning" of the vehicle when the vehicle is moved backward means clockwise turning when the vehicle is viewed from above the vehicle (a direction in which the Earth is rotating when the Earth is viewed from the North Pole to the South Pole.) The parking assist apparatus 3 of the parking assist system 1 will be described below in detail and concretely.

<1-2. Configuration>

Figure 3:
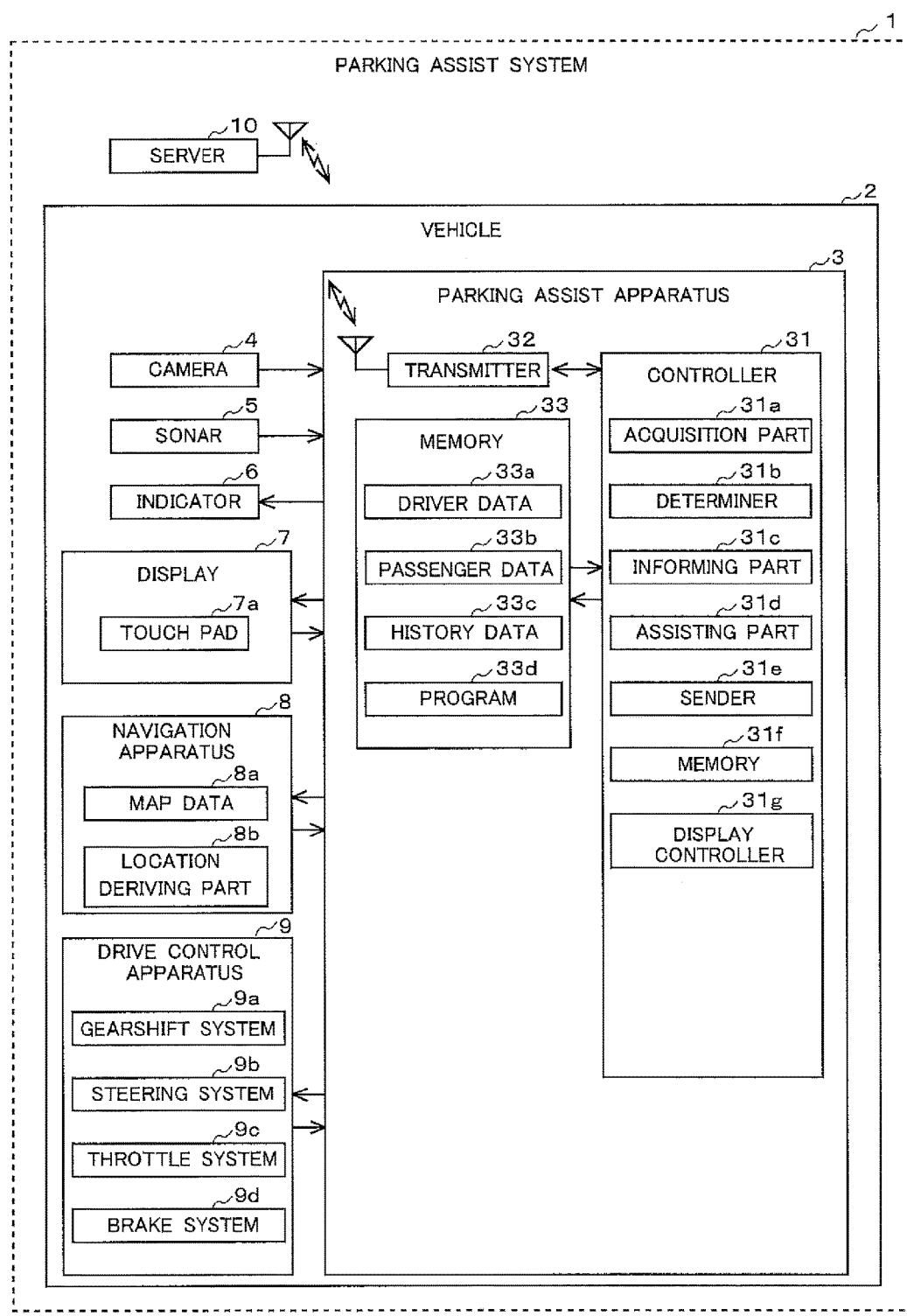
FIG. 3 illustrates a configuration of the parking assist system.

FIG. 3 illustrates a block diagram showing a configuration of the parking assist system 1. The parking assist system 1 includes the vehicle 2 including the parking assist apparatus 3 and the server 10.

The vehicle 2 is a car driven by the driver. The vehicle 2 may be a business vehicle, such as a bus and a truck, in addition to a private car. Moreover, the vehicle 2 may be an army vehicle. In other words, the vehicle 2 may be any vehicle parked by the driver into the parking space PA. The vehicle 2 includes the parking assist apparatus 3, cameras 4, sonar 5, an indicator 6, a display 7, a navigation apparatus 8 and a drive control apparatus 9.

The parking assist apparatus 3 is an electronic control apparatus that assists the driver in driving the vehicle 2 to park. The parking assist apparatus 3 recognizes a parking position by the cameras 4 mounted on the vehicle 2, by the sonar 5 detecting a distance to an object, by lighting of the indicator 6, etc. The parking assist apparatus 3 includes a controller 31, a transmitter 32 and a memory 33.

The controller 31 is a microcomputer including a CPU (central processing unit), a RAM (random access memory) and a ROM (read only memory). The controller 31 controls the entire parking assist apparatus 3. Functions of the controller 31 will be described later.

The transmitter 32 is a communication apparatus that sends and receives data to/from the server 10 via a network. The transmitter 32 is a wireless communication apparatus using, for example, worldwide interoperability for microwave access (WiMAX), long term evolution (LTE), etc.

The memory 33 stores data. The memory 33 is a non-volatile memory, such as an electrical erasable programmable read-only memory (EEPROM), a flash memory and a hard disk drive including a magnetic disk. The memory 33 stores driver data 33a, passenger data 33b, history data 33c and a program 33d.

The driver data 33a is data relating to the driver who drives the vehicle 2. The driver data 33a includes gender, age, driving experience, etc. of the driver. The driver data 33a is input to the parking assist apparatus 3 by the driver before the driver starts driving the vehicle 2.

The passenger data 33b is data relating to a number of passengers in the vehicle 2. The passenger data 33b is updated based on the number of the passengers detected by a sensor, not illustrated, provided to seats in the vehicle 2.

The history data 33c is data showing no need of the parking assistance based on parking history of the driver of the vehicle 2. In other words, the driver does not necessarily need the parking assistance at a garage at home or in a frequently-using parking lot because the driver is familiar with the parking operation there. Therefore, in a case where the vehicle 2 enters a parking lot, whether or not the parking assistance needs to be executed is determined, referring to the history data 33c.

The program 33d is firmware read out and executed by the controller 31 to control the parking assist apparatus 3.

Each of the cameras 4 is a video camera including a charge coupled device (CCD) image sensor or a complementary metal oxide semiconductor (CMOS) image sensor. The cameras 4 are provided to, for example, a front grill, left and right side mirrors and a rear gate to capture images of an object in surroundings of the vehicle 2. Once capturing the images of the object, the cameras 4 generate image signals and send the generated image signals to the controller 31.

The sonar 5 is an ultrasonic sensor that detects a distance to the object existing in some ten centimeters from a body of the vehicle 2 by transmitting ultrasonic waves to a vicinity of the vehicle 2. Once detecting the object, the sonar 5 sends object data to the controller 31.

The indicator 6 is a lighting-type indicator that provides an instruction of a driving operation to the driver by lighting a lamp. The indicator 6 is provided in some positions inside an inner panel. For example, in order to provide an instruction to the driver to turn the steering wheel rightward, the indicator 6 provided on a right side viewed from the driver is lit. In addition to lighting the indicator, a sound may be output from a buzzer and the like.

The display 7 is a display apparatus that displays an image and the like. The display 7 is, for example, a liquid crystal display and an electro-luminescence (EL) display. The display 7 includes a touch pad 7a.

When the user touches a region showing a letter, a symbol, etc. displayed on the display 7 with a hand or a finger of the user to apply a pressure on a position, the touch pad 7a obtains position data corresponding to the touched position on a screen of the display 7. The touch pad 7a sends the obtained position data relating to the position on the screen, to the controller 31. The display 7 and the touch pad 7a may be referred to collectively as a touch panel.

The navigation apparatus S displays a current location of the vehicle 2 on a map, and provides a route guidance to a destination to the user. The navigation apparatus 8 includes map data 8a and a location deriving part 8b.

The map data 8a is a vector map or a raster map including roads, types of parking lots, buildings, railroads, administrative districts, coasts, rivers, lakes and ponds. The roads and the like are associated with addresses, latitudes and longitudes.

The location deriving part 8b is a measuring device that measures the current location of the vehicle 2 on the Earth using a satellite positioning system, such as global positioning system (PGS) and global navigation satellite system (GLONASS). A receiver, not illustrated, of the location deriving part 8b receives signals sent from a plurality of satellites to measure the current location based on the received signals. The current location is indicated by a latitude and a longitude. Once measuring the current location, the location deriving part 8b sends the measured current location to the controller 31, as the position data.

The drive control apparatus 9 is an electronic control apparatus that controls drive mechanisms (steering wheel, engine and brake), not illustrated, in the vehicle 2 to control move of the vehicle 2. Moreover, the drive control apparatus 9 sends, to the controller 31, states of the drive mechanisms. The states show, for example, a position of a gearshift moved by the driver and an operation angle of the steering wheel. The drive control apparatus 9 includes a gearshift system 9a, a steering system 9b, a throttle system 9c and a brake system 9d.

The gearshift system 9a is connected to a gearshift position sensor, not illustrated, and detects the gearshift position of the vehicle 2 moved by the driver.

The steering system 9b controls the steering wheel of the vehicle 2. The steering system 9b controls the steering wheel to change a travelling direction of the vehicle 2.

The throttle system 9c controls the engine of the vehicle 2. The throttle system 9c controls the engine to run the vehicle 2. The engine is an internal combustion engine or an electric motor.

The brake system 9d controls the brake (brake and parking brake) of the vehicle 2. The brake system 9d controls the brake to reduce a speed of the vehicle 2 or to stop the vehicle 2 by applying brake to the vehicle 2. Moreover, the brake system 9d detects a braking state of the brake.

The server 10 is a large-scale computing processing apparatus that sends and receives data and the like to/from another computer over an information network. The server 10 receives and stores data of a plurality of the parking condition and the actual parking techniques from the parking assist apparatus in the vehicle 2 and other vehicles. A configuration of the server 10 will be described later in details.

Next described will be a function of the controller 31 of the parking assist apparatus 3. The controller 31 includes an acquisition part 31a, a determiner 31b, an informing part 31c, an assisting part 31d, a sender 31e, a memory 31f and a display controller 31g.

The acquisition part 31a acquire's parking condition data, described later, from the sensors and data included in the vehicle 2. Moreover, the acquisition part 31a receives the parking technique model, described later, from the server 10. Once receiving the parking technique model, the acquisition part 31a sets the received parking technique model for the determiner 31b. The acquisition part 31a functions as an acquisition means.

The determiner 31b determines whether or not the parking operation for the vehicle 2 is started. At this time, the determiner 31b determines whether or not the parking operation for the vehicle 2 is started based on whether or not the vehicle 2 is approaching the empty parking space PA, referring to images sent from the cameras 4. Thus, the determiner 31b is configured to determine whether or not the parking operation for the vehicle 2 is started, not only in a case of reverse parking of the vehicle 2 but also in a case of front parking of the vehicle 2. The determiner 31b functions as a determination means.

The determiner 31b also determines whether or not the vehicle 2 has left the parking lot. At this time, the determiner 31b determines whether or not the vehicle 2 has left the parking lot by acquiring the current location of the vehicle 2 from the navigation apparatus 8.

Moreover, the determiner 31b determines whether or not the parking operation that the driver is performing is different from the parking technique model set for the determiner 31b. For example, in a case where the parking technique model shows "backward moving and leftward turning," if the parking operation that the driver is performing shows "frontward moving" or "rightward turning," the determiner 31b determines that the parking operation is different from the parking technique model.

The determiner 31b also determines whether or not the parking operation is completed. At this time, the determiner 31b determines whether or not the parking operation is completed based on the images from the cameras 4 and based on data shown by the drive control apparatus 9. For example, the determiner 31b determines that the parking operation is completed if the determiner 31b determines that the vehicle 2 is in the parking space in the images from the cameras 4 and that the parking brake is applied based on a signal from the brake system 9d.

The informing part 31c outputs the question to the driver about whether or not the driver needs the parking assistance. The informing part 31c displays, for example, a message showing that "Do you need driving assistance?" on the display 7. In addition, the informing part 31c displays an image of, for example, "Yes" and "No" for an answer to the message, on the display 7. The informing part 31c functions as an informing means.

Figure 4:
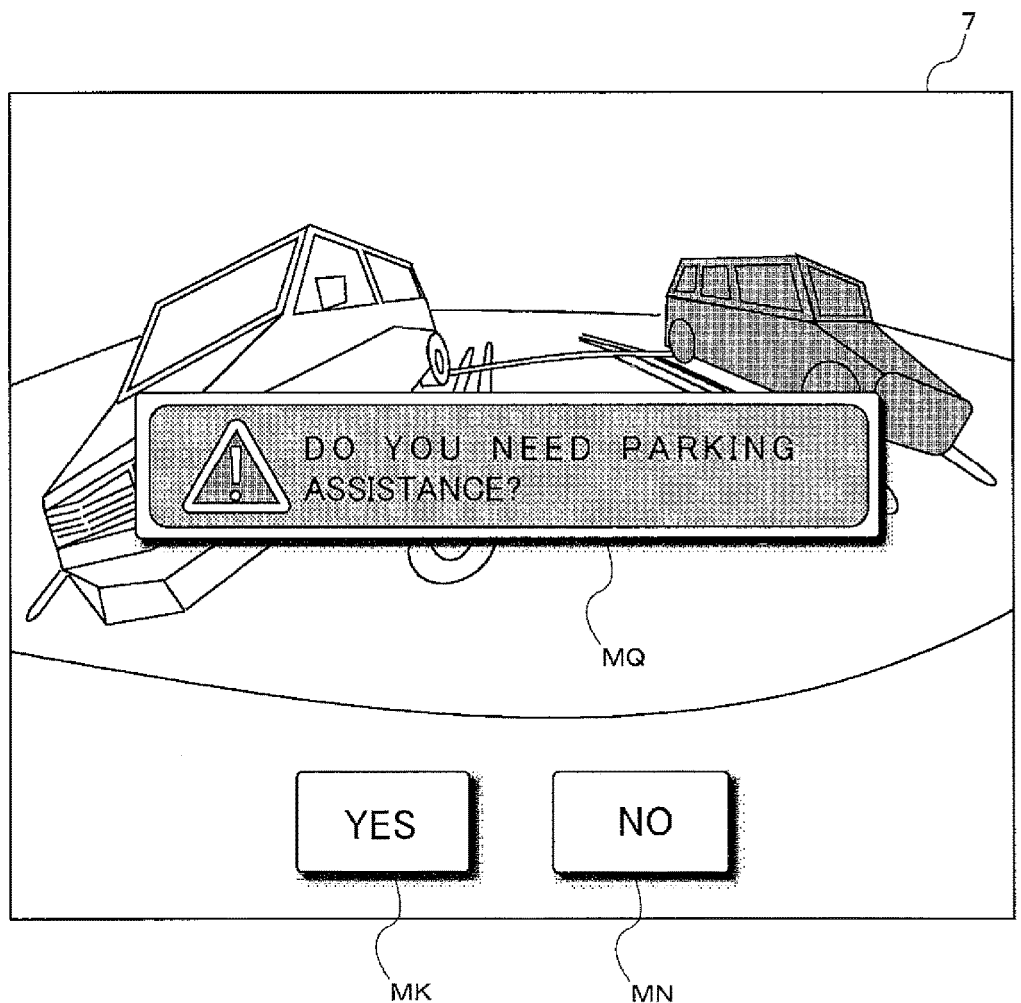
FIG. 4 illustrates an example of a displayed screen on a display.

FIG. 4 illustrates an example of the message that the informing part 31c outputs to the driver to ask about whether or not the parking assistance needs to be started. In a case where the driver performs the parking operation different from the parking technique model, i.e. where the driver is struggling with the parking operation, the informing part 31c displays, on the display 7, a message MQ asking the question about whether or not the parking assistance needs to be started. The message MQ is, for example, "Do you need driving assistance?" Moreover, buttons corresponding to the touch pad 7a are displayed on the display 7. The displayed buttons are a "Yes" button MK and a "No" button MN. The driver touches the "Yes" button MK or the "No" button MN to input an answer of the driver to the question about whether or not the driver needs driving assistance.

The functions of the controller 31 will be described with reference back to FIG. 3. The assisting part 31d lights the indicator 6 based on a layout of parking spaces and a location of an object in the vicinity of the vehicle 2 recognized by the cameras 4 and by the sonar 5, to assist the driver in the driving operation of the vehicle 2. In other words, the assisting part 31d shows, to the driver, an operation direction of the steering wheel such that the vehicle 2 is parked smoothly into the parking space. Moreover, the assisting part 31d may park the vehicle 2 without an operation of the driver of the vehicle 2, i.e., autonomous driving, by controlling the drive control apparatus 9. The assisting part 31d automatically controls parking of the vehicle 2 to park the vehicle 2 into the parking space PA without an operation of the steering wheel, the throttle pedal and the brake by the driver. The assisting part 31d functions as an assisting means.

The sender 31e controls the transmitter 32 to send and receive data to/from an apparatus and the like outside the parking assist apparatus 3. The sender 31e sends, for example, the parking condition data acquired by the acquisition part 31a, to the server 10.

The memory 31f stores the actual parking technique for the vehicle 2. The memory 31f stores the gearshift position and operations of the steering wheel, the throttle pedal and the brake after the driver starts the parking operation for the vehicle 2, as parking technique data. It is possible to determine a technique used to park the vehicle 2 by analyzing the actual parking technique stored by the memory 31f. For example, it is possible to determine that the vehicle 2 has been parked by being moved backward and being turned leftward. The parking technique data stored by the memory 31f is sent to the server 10 by the sender 31e and is used as original data to generate the parking technique model.

The display controller 31g displays images and the like on the display 7 and also cancels display of the images on the display 7. Examples of the images displayed on the display 7 by the display controller 31g are a map image for the route guidance, an image showing an area behind the vehicle 2, letters and graphics.

Figure 5:
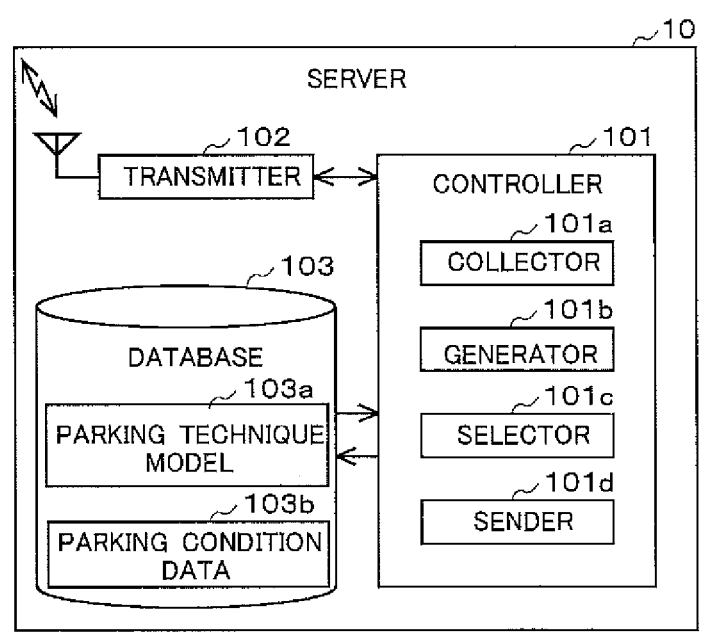
FIG. 5 illustrates a configuration of a server.

Next, a configuration of the server 10 will be described. The server 10 is a hosting server that is used by a plurality of drivers, having a large-scale storage area and high computation performance. FIG. 5 illustrates a block diagram showing the configuration of the server 10. The server 10 includes a controller 101, a transmitter 102 and a database 103.

The controller 101 is a computer that includes a CPU, a RAM and a ROM. The controller 101 controls the entire server 10. Functions of the controller 101 will be described later.

The transmitter 102 sends and receives the data to/from the parking assist apparatus 3 via the network. The transmitter 102 is a wireless communication apparatus using, for example, WiMAX, LTE, etc.

The database 103 is a memory that stores the data. The database 103 is a nonvolatile memory, such an EEPROM, a flash memory and a hard disk drive including a magnetic disk. The database 103 accumulates (stores) a parking technique model 103a and parking condition data 103b.

The parking technique model 103a is data of collected techniques that have been performed by drivers of the vehicle 2 including the parking assist apparatus 3 to actually park the vehicle 2 into the parking space PA under certain parking condition. For example, the parking technique model 103a shows "backward moving and leftward turning." A plurality of the parking technique models 103a are stored in the database 103.

Each of the parking condition data 103b is a data group showing a plurality of the parking condition in which the vehicle 2 has been parked. Each of the parking condition data 103b shows a type of a parking lot, driver information, a time of a day, etc. The parking condition data 103b is the parking condition acquired when the driving technique shown by the parking technique model 103a. Therefore, the parking condition data 103b and the parking technique model 103a are associated with each other.

FIG. 6 illustrates an example of the parking technique model 103a and the parking condition data 103b input in the database 103. The parking technique model 103a and the parking condition data 103b are associated with each other and a plurality of the parking technique models 103a and the parking condition data 103b are input in the database 103.

As described above, the parking technique model 103a is the data showing the technique that has been actually performed to park the vehicle into the parking space PA under the condition shown by the parking condition data 103b. Thus, the parking technique model 103a shows the generally-used or ideal parking technique under the parking condition shown by the parking condition data 103b. It is not necessarily one driver who has performed the parking technique while driving the vehicle because the parking technique model 103a is generated by the server 10 based on actual parking techniques performed by various drivers.

Moreover, in a case where the driver is struggling with parking or a case where the driver desires to use the parking assistance, the parking technique model 103a associated with same or similar parking condition of the driver is selected from the database 103. For example, in a case where the selected parking technique model 103a shows the parking technique "backward moving and leftward turning," the parking assist apparatus 3 assists the driver of the vehicle 2 in moving backward and turning leftward to park the vehicle 2.

The parking condition data 103b is a plurality of data groups D showing condition acquired when the vehicle 2 is parked. More specifically, the parking condition data 103b includes a parking lot type D1, driver information (gender) D2, driver information (age) D3, driver information (experience) D4, times of a day D5, passengers number D6, pedestrians number D7, a parking space PA facing direction D8, an oncoming vehicle D9, a subsequent vehicle D10 and a travelling direction D11.

The parking lot type D1 is, for example, "parking lot of a shopping mall" or "parking lot in a service area." The driver information (gender) D2 is "male" or "female." The driver information (age) D3 is an age of the driver, such as "50s." The driver information (experience) D4 is "beginner," "experienced," or "skilled." The times of a day D5 is "early morning," "daytime," "evening," "nighttime," or "midnight." The passengers number D6 is a number of passengers in the vehicle 2. The pedestrians number D7 is a number of pedestrians walking in the parking lot in which the vehicle 2 is. The parking space PA facing direction D8 is "orthogonal," "parallel," or "diagonal." The oncoming vehicle D9 is presence or absence of a vehicle coming in a direction opposite to the travelling direction of the vehicle 2.

The subsequent vehicle D10 is presence or absence of a vehicle behind the vehicle 2. The travelling direction D11 is a direction in which the vehicle 2 is travelling and is "forward" or "backward,"

The functions of the controller 101 in the server 10 will be described with reference back to FIG. 5. The controller 101 includes a collector 101a, a generator 101b, a selector 101c and a sender 101d.

The collector 101a collects the parking condition data and the parking technique data sent from the parking assist apparatus 3 via the transmitter 102. The collector 101a collects, as the parking condition data, the parking condition in which the driver is performing the parking operation without using the parking technique model and, as the parking condition data, the parking condition in which the driver desires to use the parking assistance. The parking condition data collected when the driver is performing the parking operation without using the parking technique model is used to generate a new parking technique model. The parking condition data collected when the driver desires to use the parking assistance is used to select one parking technique model from amongst the already-generated parking technique models. The collector 101a functions as a collecting means.

The generator 101b generates the parking technique model. In other words, the generator 101b analyzes the parking condition data and the parking technique data received by the collector 101a to recognize the parking condition and the actual parking technique under the parking condition. For example, in a case where "a 50s male skilled driver drives a vehicle having two passengers in total in a shopping mall parking lot having no oncoming vehicle but having one subsequent vehicle and 15 pedestrians in an evening, moving straight ahead along a parking space orthogonal to a travelling direction of the vehicle," if the driver completes parking by "backward moving and leftward turning," the generator 101b generates "backward moving and leftward turning" as the parking technique model associated with the parking condition. Once generating the parking technique model, the generator 101b stores the generated model to the database 103. The generator 101b functions as a generating means.

The selector 101c selects one parking technique model associated with the parking condition data matched to the parking condition data received by the collector 101a, referring to the database 103. The parking condition data does not have to be perfectly matched. Out of the eleven items of the parking condition data (D1 to D11), a predetermined number of items, e.g., six items or more, should be matched. Even the parking technique model associated with partially-matched parking condition data is useful for the driver struggling with the parking operation.

The sender 101d sends the parking technique model selected by the selector 101c, to the parking assist apparatus 3 via the transmitter 102. Thus, the parking assist apparatus 3 receives the most appropriate parking technique model selected by the server 10 and executes the parking assistance for the driver.

<1-3. Steps>

Figure 7:
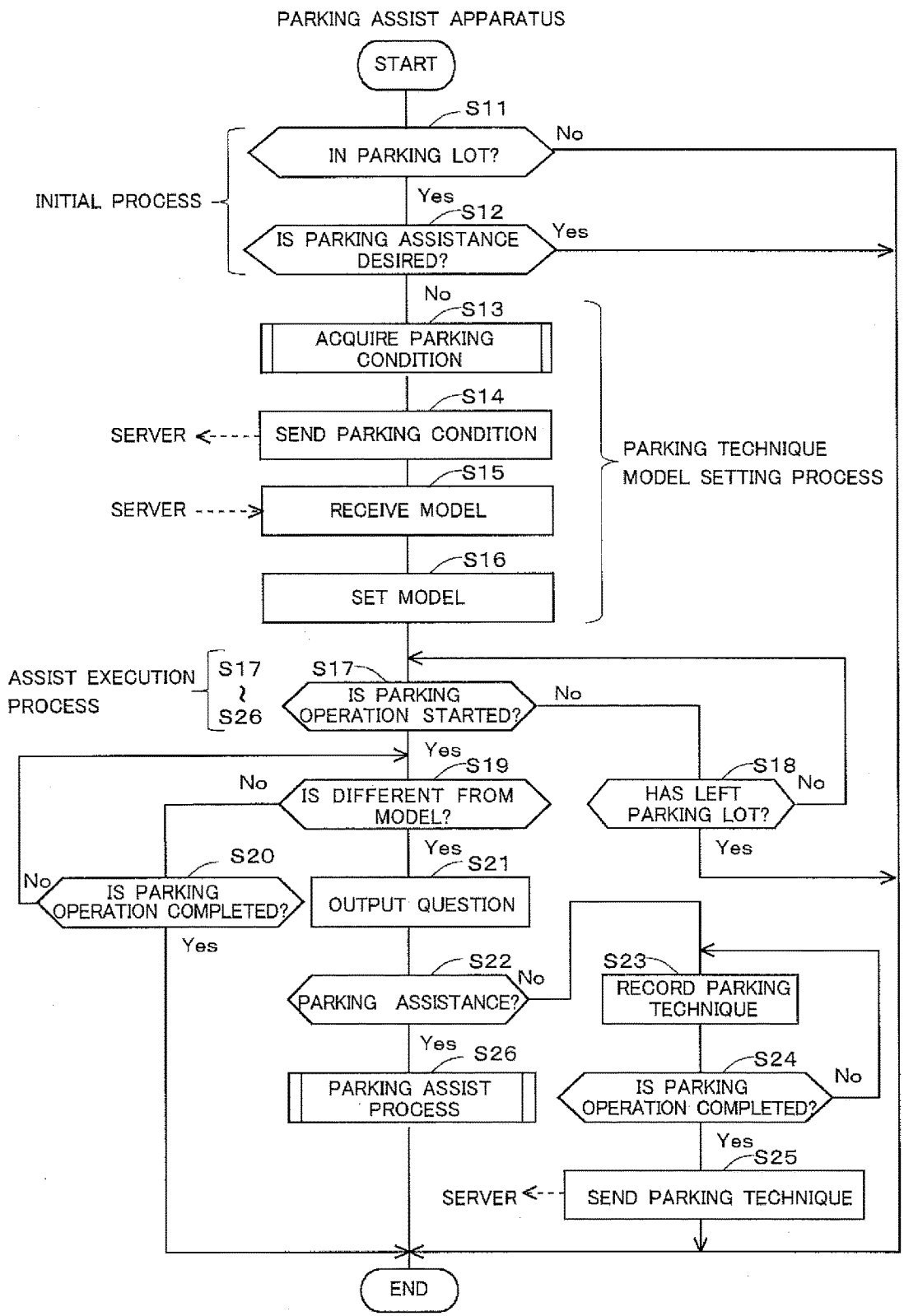
FIG. 7 illustrates process steps of a parking assist apparatus.
Figure 8:
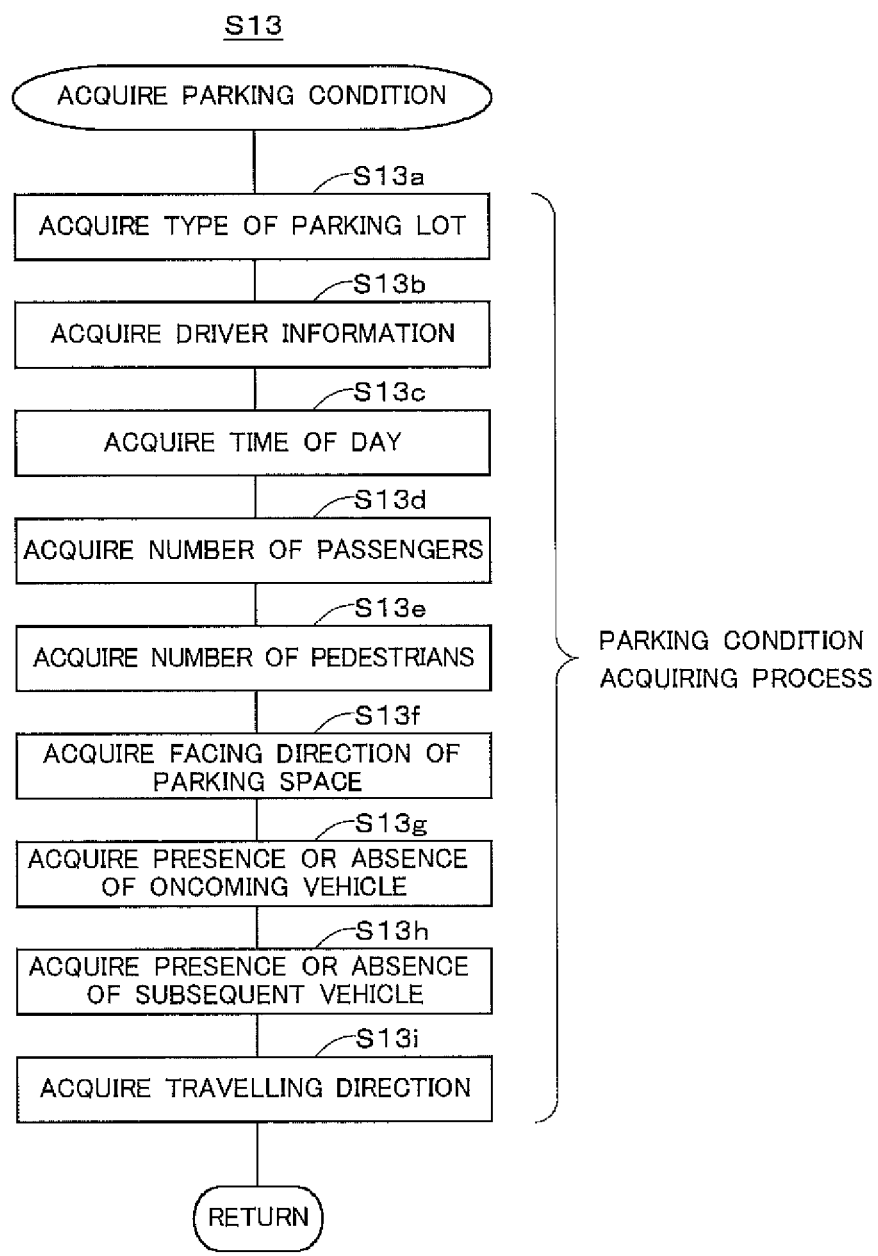
FIG. 8 illustrates process steps of the parking assist apparatus.
Figure 9:
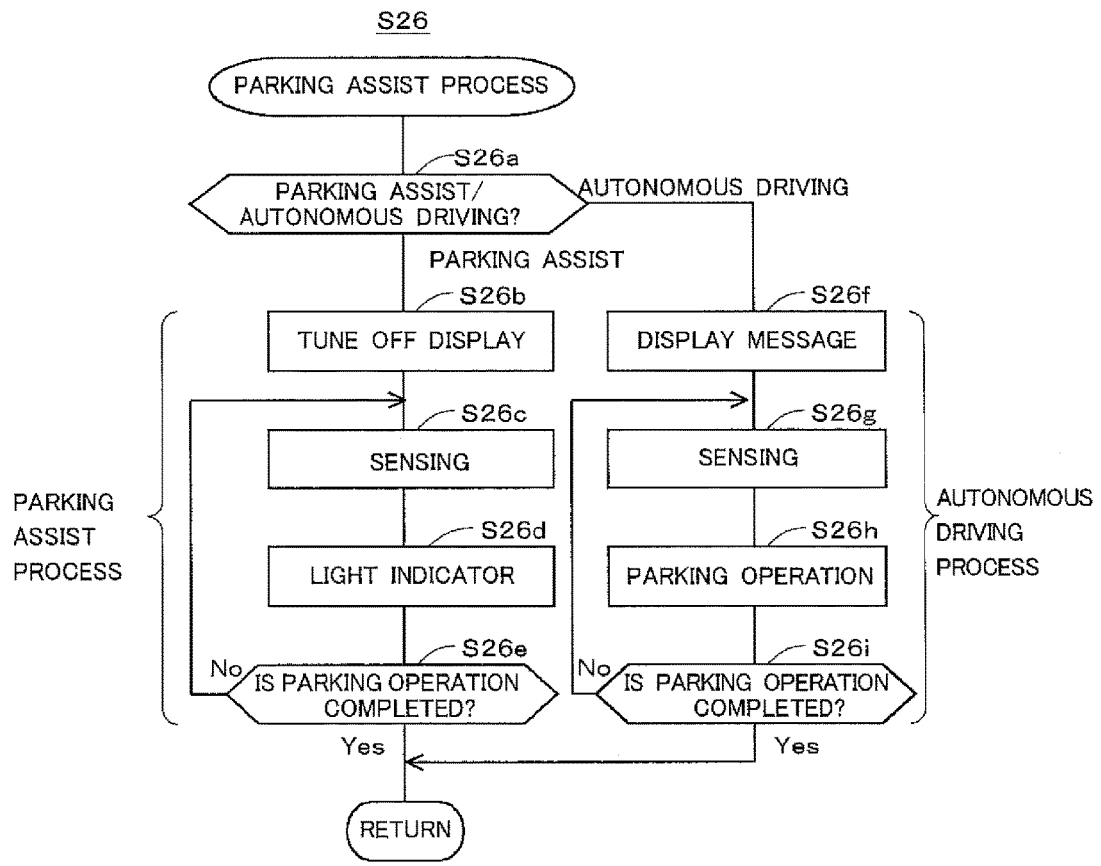
FIG. 9 illustrates process steps of the parking assist apparatus.

Next, process steps of the parking assist apparatus 3 will be described below. FIGS. 7 to 9 are flowcharts showing the process steps of the parking assist apparatus 3. FIG. 7 is a flowchart showing process steps of a main routine to be performed by the parking assist apparatus 3. The process steps are repeatedly performed in a predetermine time cycle. A step S11 and a step S12 are an initial process as a beginning of the entire process. Steps S13 to S16 are a parking technique model setting process that sets the parking technique model for the parking assist apparatus 3. Steps S17 to S26 are an assist execution process that executes the parking assistance.

When the entire process starts, the determiner 31b determines whether or not the vehicle 2 is in a parking lot (the step S11). The determiner 31b acquires the current location and a site of the vehicle 2 from the navigation apparatus 8 to make a determination.

In a case where the determiner 31b determines that the vehicle 2 is not in a parking lot (No in the step S11), the process ends because the parking assistance is a control that is executed in a parking lot.

In a case where the determiner 31b determines that the vehicle 2 is in a parking lot (Yes in the step S11), the assisting part 31d determines whether or not the parking assistance is necessary in the parking lot in which the vehicle 2 is, referring to the history data 33c of the memory 33 (the step S12). In other words, the driver does not necessarily need the parking assistance in a familiar parking lot, such as a parking lot that the driver daily uses. In this case, if the driver inputs beforehand, to the parking assist apparatus 3, that the parking assistance is not necessary in a predetermined parking lot, it can be prevented that the parking assistance is executed whenever the driver is in the parking lot. Therefore, there is a case where the history data 33c of the memory 33 stores information that the parking assistance is not necessary, associated with the predetermine parking lot.

In a case where the assisting part 31d determines that the parking assistance is unnecessary (Yes in the step S12), the process ends because the driver does not need the parking assistance so that there is no need to execute the parking assistance.

On the other hand, in a case where the assisting part 31d determines that the parking assistance is not unnecessary (No in the step S12), the acquisition part 31a acquires parking condition in which the vehicle 2 is (the step S13).

FIG. 8 is a flowchart showing details of the process step (the step S13) in which the acquisition part 31a acquires the parking condition.

When the step S13 is started, the acquisition part 31a acquires type data of the parking lot in which the vehicle 2 is from the navigation apparatus 8 (a step S13a).

Once acquiring the type data of the parking lot, the acquisition part 31a acquires driver information, referring to the driver data 33a in the memory 33 (a step S13b). The driver information acquired by the acquisition part 31a includes gender, age and driving experience of the driver.

Once acquiring the driver information, the acquisition part 31a acquires current times of a day from the navigation apparatus 8 (a step S13c). The times of a day acquired by the acquisition part 31a is, for example, "evening."

Once acquiring the times of a day, the acquisition part 31a acquires a number of passengers of the vehicle 2 from seat sensors (not illustrated) provided to seats of the vehicle 2 (a step S13d).

Once acquiring the number of passengers of the vehicle 2, the acquisition part 31a acquires a number of pedestrians walking in the parking lot based on images of the parking lot captured by the cameras 4 (a step S13e). The number of pedestrians can be detected from the captured images of the parking lot by use of a well-known image processing method, such as pattern matching.

Once acquiring the number of pedestrians, the acquisition part 31a acquires a facing direction of the parking space PA closest to the vehicle 2 and having no vehicle parked, based on the images of the parking lot captured by the cameras 4 (a step S13f). The facing direction of the parking space PA can be detected from the captured images of the parking lot by use of a well-known image processing method, such as white line detection process.

Once acquiring the facing direction of the parking space PA, the acquisition part 31a acquires presence or absence of an oncoming vehicle and a subsequent vehicle of the vehicle 2, based on the images captured by the cameras 4 provided on front and rear sides of the vehicle 2 (steps S13g and S13h). A well-known image processing method, such as the foregoing pattern matching method, can be used.

Once acquiring presence or absence of an oncoming vehicle and a subsequent vehicle of the vehicle 2, the acquisition part 31a acquires a travelling direction of the vehicle 2, based on a gearshift position shown by the gearshift system 9a (a step S13i). In a case where the gearshift position shown by the gearshift system 9a is "drive," it is determined that the travelling direction of the vehicle 2 is "forward." On the other hand, in a case where the gearshift position shown by the gearshift system 9a is "reverse," it is determined that the travelling direction of the vehicle 2 is "backward."

Once the acquisition part 31a acquires all of the data, the process returns to the main routine shown in FIG. 7.

The process steps of the parking assist apparatus 3 will be described with reference back to FIG. 7. Once the acquisition part 31a acquires all of the data (the step S13), the sender 31e sends the data acquired by the acquisition part 31a, to the server 10 via the transmitter 32 (the step S14).

Once the sender 31e sends the parking condition data to the server 10, the parking assist apparatus 3 stands by until the server 10 sends back the parking technique model 103a.

Once the server 10 sends the parking technique model 103a to the parking assist apparatus 3, the acquisition part 31a receives the parking technique model 103a (the step S15).

Once receiving the parking technique model 103a, the acquisition part 31a sets the received parking technique model 103a for the determiner 31b (the step S16).

Once the acquisition part 31a sets the parking technique model 103a for the determiner 31b, the determiner 31b determines whether or not the parking operation for the vehicle 2 is started (the step S17). The determiner 31b determines whether or not the parking operation for the vehicle 2 is started based on whether or not the vehicle 2 is approaching the empty parking space PA, referring to the image sent from 4. As described above, it is recommended that the determiner 31b should determine whether or not the parking operation is started based on images. The determiner 31b cannot always determine whether or not the parking operation is started only based on the gearshift position because there is a case of reverse parking of the vehicle 2 and also a case of front parking of the vehicle 2.

In a case where the determiner 31b determines that the parking operation for the vehicle 2 is not started (No in the step S17), the determiner 31b determines whether or not the vehicle 2 has left the parking lot (the step S18).

In a case where the determiner 31b determines that the vehicle 2 has not left the parking lot (No in the step S18), the determiner 31b repeatedly determines whether or not the parking operation is started in the step S17 until the vehicle 2 leaves the parking lot.

On the other hand, in a case where the determiner 31b determines that the vehicle 2 has left the parking lot (Yes in the step S18), the process ends because the vehicle 2 has left the parking lot so that the parking assistance is no longer necessary.

In a case where the determiner 31b determines that the parking operation for the vehicle 2 is started in the step S17 (Yes in the step S17), the determiner 31b acquires operations of the steering wheel and the like from the drive control apparatus 9 and then determines whether or not the parking operation that the driver is performing is different from the parking technique model set for the determiner 31b (the step S19).

In a case where the determiner 31b determines that the parking operation that the driver is performing is not different from the parking technique model (No in the step S19), the determiner 31b determines whether or not the parking operation is completed (the step S20). The determiner 31b determines whether or not the parking operation is completed based on the images captured by the cameras 4 and based on data shown by the drive control apparatus 9.

In a case where the determiner 31b determines that the parking operation is completed (Yes in the step S20), the process ends because the parking operation for the vehicle 2 is completed so that the parking assistance is no longer necessary.

On the other hand, in a case where the determiner 31b determines that the parking operation is not completed (No in the step S20), the process returns to the step S19 and the determiner 31b determines again whether or not the parking operation that the driver is performing is different from the parking technique model.

In a case where the determiner 31b determines that the parking operation that the driver is performing is different from the parking technique model in the step S19 (Yes in the step S19), the informing part 31c outputs the question to the driver about whether or not the driver needs the parking assistance (the step S21). The case where the parking operation that the driver is performing is different from the parking technique model may be a case where the driver is struggling with the parking operation for the vehicle 2. In other words, the parking technique model shows the generally-used or ideal parking technique under certain parking condition. Therefore, in a case where the actual parking technique different from the parking technique model is performed, it can be determined that the driver is struggling with the parking operation. A message is displayed on the display 7 as the question output by the informing part 31c in the step S21.

Once the informing part 31c outputs the question to the driver about whether or not the driver needs the parking assistance, the display controller 31g determines whether or not the driver accepts the questioned parking assistance (the step S22). The display controller 31g makes a determination based on input to the touch pad 7a by the driver. In other words, in a case where the driver accepts the parking assistance, the driver touches a button showing approval (e.g., "Yes") on the display 7. In a case where the driver does not accept the parking assistance, the driver touches a button showing disapproval (e.g., "No").

Once the display controller 31g determines that the driver does not accept the parking assistance (No in the step S22), the memory 31f records the actual parking technique performed by the driver who does not use the parking assistance (the step S23). Once the memory 31f records the actual parking technique, the determiner 31b determines whether or not the parking operation is completed (the step S24).

Once the determiner 31b determines that the parking operation is not completed (No in the step S24), the memory 31f continues recording the actual parking technique until the determiner 31b determines that the parking operation is completed (the step S23).

On the other hand, in a case where the determiner 31b determines that the parking operation is completed (Yes in the step S24), the sender 31e sends the actual parking technique recorded by the memory 31f, to the server 10 (the step S25). As described above, the actual parking technique performed by the driver without using the parking assistance is recorded by the memory 31f and is sent to the server 10. The actual parking technique sent to the server 10 is associated with the parking condition sent beforehand in the step S14 to serve as data to be used to generate a new parking technique model. Once the sender 31e sends the actual parking technique to the server 10, the process ends because the parking is completed.

In a case where the display controller 31g determines that the driver accepts the parking assistance (Yes in the step S22), the assisting part 31d starts the parking assistance (the step S26).

FIG. 9 is a flowchart showing details of the process step for the parking assistance executed by the assisting part 31d. Once a parking assist process is started, the assisting part 31d determines whether "parking assistance" or "autonomous driving" is selected (a step S26a). For selection, the driver may select beforehand and store one of "parking assistance" and "autonomous driving," or the assisting part 31d may output a question to the driver every time before the assisting part 31d executes the parking assist process.

Steps S26b to S26e are the parking assist process. The parking assist process is for the parking assist apparatus 3 to assist the driver in the parking operation.

In a case where the assisting part 31d determines that the "parking assistance" has been selected ("parking assistance" in the step 26a), the display controller 31g tunes off the display 7 (the step S26b). In other words, no image or no footage is displayed on the display 7. Thus, since no image showing the vicinity of the vehicle 2 and the like is displayed on the display 7, the driver needs to actively confirm safety in the vicinity of the vehicle 2 himself/herself. Therefore, the display controller 31g turns off the display 7 to prompt the driver to confirm safety by visual contact having higher safety.

Once the display controller 31g turns off the display 7, the assisting part 31d performs sensing based on the data sent from the cameras 4 and the sonar 5 (the step S26c). In other words, the assisting part 31d detects the parking area based on the image data sent from the cameras 4, and also detects an object in the vicinity of the vehicle 2 based on data of the object sent from the sonar 5.

Once performing sensing, the assisting part 31d lights the indicator 6 in accordance with the parking technique model 103a set by the acquisition part 31a in the step S16, and then instructs the driver about the parking operation so as to park the vehicle 2 within the parking space PA (the step S26d). In other words, in a case where the parking technique model 103a shows "backward moving and leftward turning," the assisting part 31d instructs the driver, by the indicator 6, to move the gearshift to reverse, apply pressure on an accelerator pedal and turn the steering wheel leftward.

Once the assisting part 31d instructs the driver about the parking operation by lighting the indicator 6, the determiner 31b determines whether or not the parking operation is completed (the step 26e).

While the determiner 31b determines that the parking operation is not completed (No in the step S26e), the assisting part 31d repeatedly performs the sensing (the step S26c) and instructs the driver about the parking operation by the indicator 6 (the step S26d).

On the other hand, in a case where the determiner 31b determines that the parking operation is completed (Yes in the step S26e), the process returns to the process in FIG. 7 and the parking assist process ends.

Steps S26f to S26i are an autonomous driving process. The autonomous driving process is for the parking assist apparatus 3 to park the vehicle automatically without an operation by the driver.

In the step S26a, in a case where the assisting part 31d determines that "the autonomous driving" has been selected ("autonomous driving" in the step 26a), the display controller 31g displays a message indicating that the autonomous driving will start, on the display 7 (the step S26f). Since autonomous drive controls the vehicle 2 without an operation by the driver, it is recommended from a safety viewpoint that start of the autonomous driving should be informed to the driver before the autonomous driving is started. For example, the display controller 31g displays the message indicating that "the autonomous driving for parking will start," on the display 7.

Once the display controller 31g displays the message on the display 7, the assisting part 31d performs the sensing (the step S26g) and executes the parking operation to park the vehicle 2 within the parking space PA in accordance with the parking technique model 103a set by the determiner 31b in the step S16 (the step S26g).

While determination by the determiner 31b that the parking operation is not completed continues (No in the step S26i), the assisting part 31d repeatedly performs the sensing (the step S26g) and the parking operation (the step S26h).

In a case where the determiner 31b determines that the parking operation is completed (Yes in the step S26i), the autonomous driving process returns to the process in FIG. 7 and the autonomous driving process ends.

Figure 10:
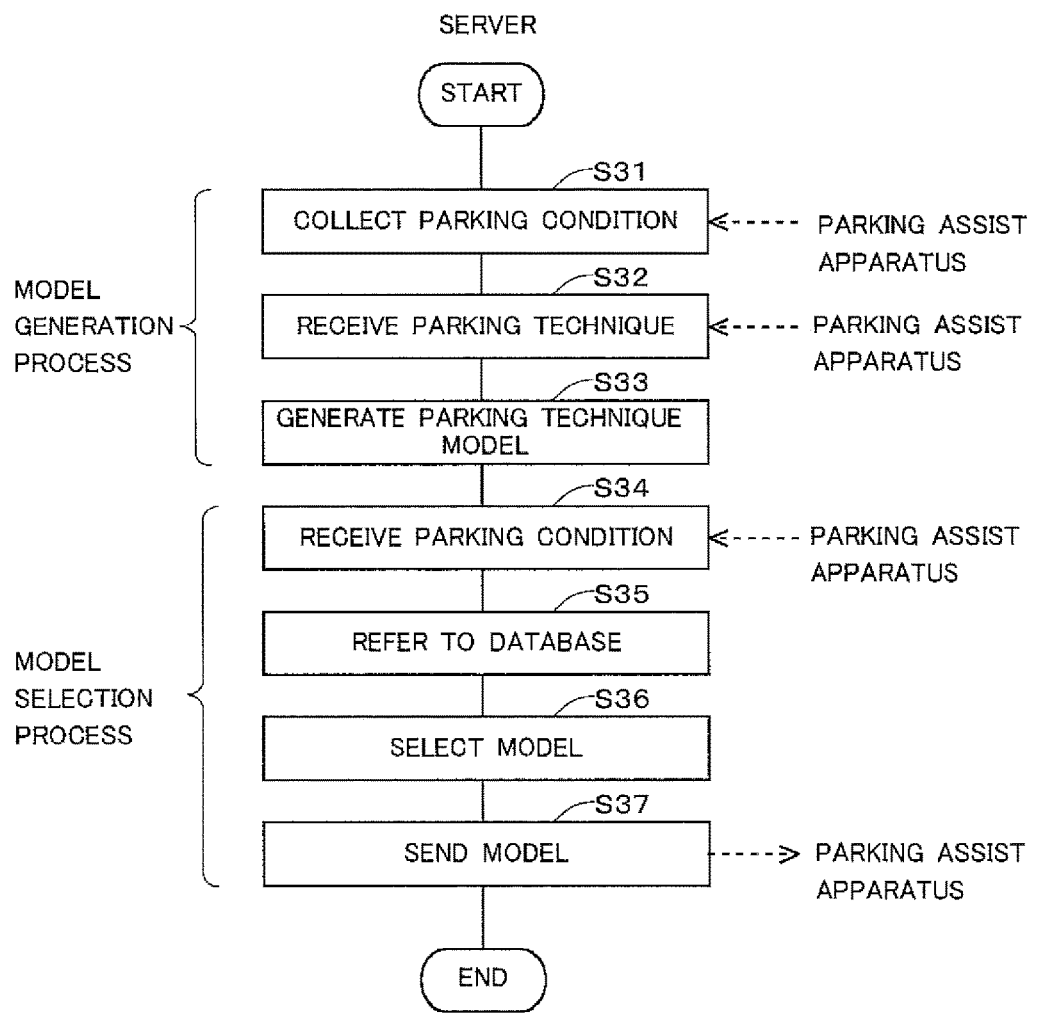
FIG. 10 is process steps of a server.

Next, the process steps of the server 10 will be described. FIG. 10 is a flowchart showing the process steps of the server 10. The process steps to be performed by the server 10 are repeatedly performed in a predetermined time cycle. Steps S31 to S33 are a model generation process that generates a new parking technique model. Moreover, steps S34 to S37 are a model selection process that selects one parking technique model from amongst the parking technique models accumulated beforehand. The model generation process and the model selection process are not necessarily performed in series, and the two processes may be performed in a different timing.

Once the process starts, the collector 101a collects the parking condition data sent from the parking assist apparatus 3 (the step S31).

Once collecting the parking condition data, the collector 101a receives the parking technique data corresponding to the parking condition, from the parking assist apparatus 3 (the step S32). The parking technique data received by the collector 101a in this process is the parking technique data recorded when a driver has performed the parking operation without using the parking assistance because the parking technique data shows the actual parking technique considered as a technique used by the user to park a vehicle without struggle.

Once the collector 101a receives the parking technique data, the generator 101b generates the parking technique model, as described above, based on the parking technique data received by the collector 101a (the step S33).

Once the generator 101b generates the parking technique model, the collector 101a receives parking condition data from the parking assist apparatus 3 (the step S34). Bing different from the parking condition data in the step S31, the parking condition data received by the collector 101a in the step S34 is the parking condition data sent to the server 10 when the driver desires to use the parking assistance.

Once the collector 101a receives the parking condition data, the selector 101c refers to the database 103 (the step S35).

The selector 101c selects one parking technique model 103a associated with the parking condition data 103b matched to the parking condition data received by the collector 101a in the step S34, referring to the database 103 (the step S36).

Once the selector 101c selects the parking technique model, the sender 101d sends the selected parking technique model to the parking assist apparatus 3 (the step S37). Thus, the parking assist apparatus 3 receives an appropriate parking technique model selected by the server 10 to execute the parking assistance for the driver.

Once the sender 101d sends the parking technique model, the process performed by the server 10 ends.

As described above, in the case where the actual parking technique that the driver is performing under certain parking condition is different from the parking technique shown by the parking technique model generated in the same parking condition, the parking assist apparatus 3 of this embodiment outputs the question to the driver about whether or not the deriver needs the parking assistance for parking the vehicle 2. In the case where the driver accepts the parking assistance, the parking assist apparatus 3 assists the driver in parking operation for the vehicle 2.

Thus, unnecessary parking assistance that the driver does not desire to use can be prevented, and parking assistance that the user truly needs is executed.

It can be prevented that the parking assistance is executed whenever the driver moves the gearshift to reverse (backward moving), and the process to be performed by the parking assist apparatus 3 can be simplified.

Moreover, in the case where the driver does not need the parking assistance, the driver does not have to cancel the parking assistance whenever the driver moves the gearshift to reverse so that troublesome operations with the parking assist apparatus 3 can be prevented.

<2. Second Embodiment>
<2-1. Outline>

Next, a second embodiment will be described. In the foregoing first embodiment, the server 10 generates and selects the parking technique model 103a. On the other hand, in the second embodiment, a parking assist apparatus 3 generates and selects a parking technique model 103a. In other words, the parking assist apparatus 3 performs a function of the server 10 in the first embodiment, in addition to the parking assistance to the driver. Thus, the parking assist apparatus 3 is configured to generate parking technique models and then to select one parking technique model according to parking condition, not via the server 10.

<2-2. Configuration and Process>

Figure 11:
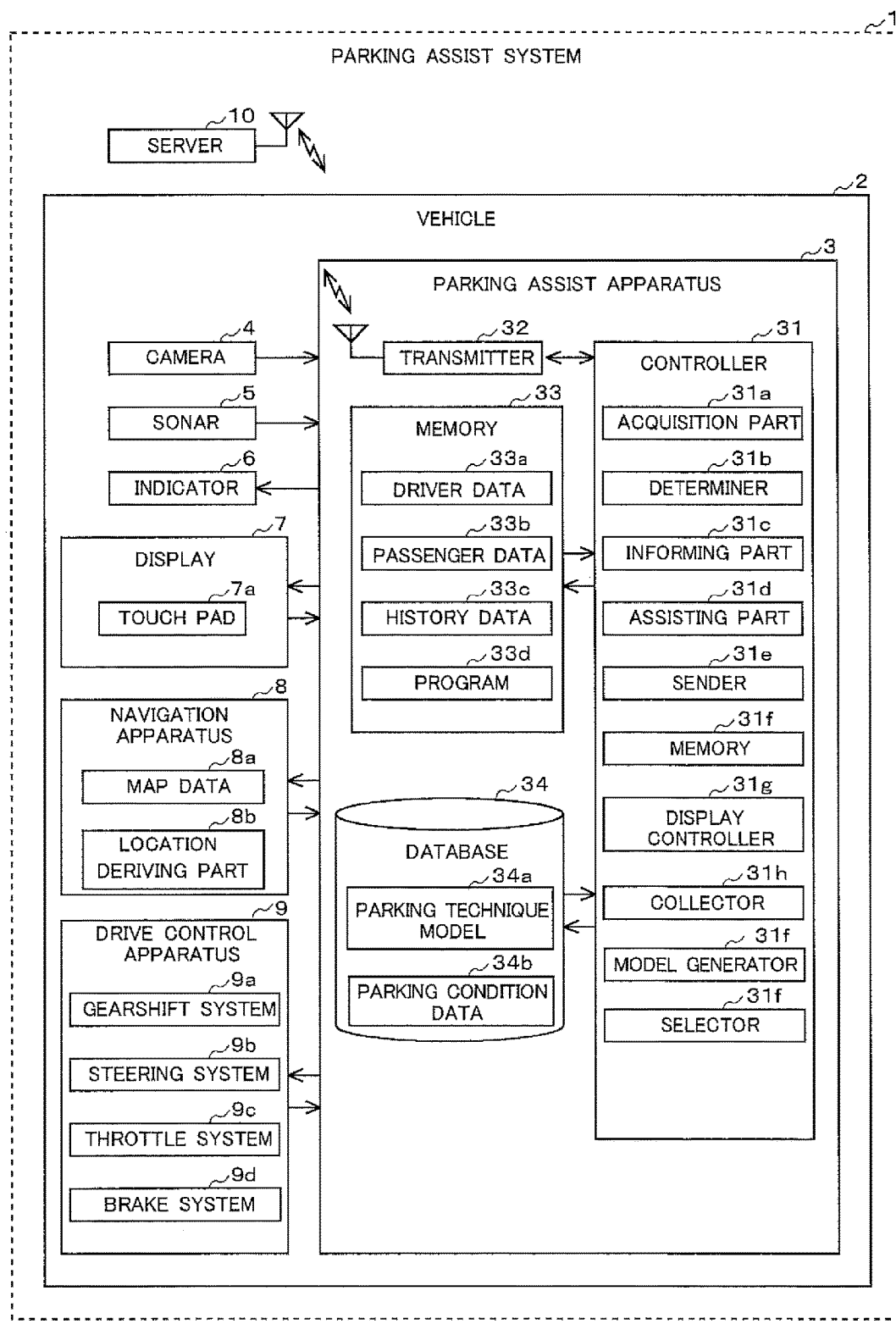
FIG. 11 illustrates a configuration of a parking assist system of a second embodiment.

FIG. 11 illustrates a configuration of the parking assist apparatus 3 in a parking assist system 1 in the second embodiment. A controller 31 of the parking assist apparatus 3 in the second embodiment includes a collector 31h, a model generator 31i and a selector 31j, in addition to the functions in the first embodiment.

The collector 31h, the model generator 31i and the selector 31j function like the collector 101a, the generator 101b and the selector 101c included in the server 10 in the first embodiment. In this case, the collector 31h collects parking condition data and parking technique data not only from the parking assist apparatus 3 in a vehicle 2 but also from parking assist apparatuses in other vehicles.

The parking assist apparatus 3 includes database 34 in addition to the controller 31, the transmitter 32 and the memory 33 in the first embodiment. The database 34 stores a parking technique model 34a and parking condition data 34b.

The database 34, the parking technique model 34a and the parking condition data 34b function like the database 103, the parking technique model 103a and the parking condition data 103b in the first embodiment.

Moreover, the parking assist apparatus 3 in the second embodiment performs the process steps performed by the server 10 in the first embodiment. In other words, the parking assist apparatus 3 performs the steps S31 to S36 in FIG. 10.

Thus, the parking assist apparatus 3 is configured to generate the parking technique models and then to select one parking technique model according to parking condition, not via the server 10, to assist the driver in the parking assistance.

<3. Modifications>

The invention is not limited to the foregoing embodiments but other modifications are possible. Some modifications of the invention will be described below. Any form of the embodiments described above and the modifications described below may be arbitrarily combined with one another.

In the foregoing embodiments, the eleven items (D1 to D11) are described as examples of the parking condition data. However, the parking condition data is not limited to the eleven items in the foregoing embodiments. Another item may be used. An example is "vehicle category," such as small car, medium-sized car and large car, and another example is "vehicle type," such as kei car, sports car and family car.

Moreover, all of the eleven items of the parking condition data do not have to be considered when one parking technique model is selected. At least one item should be considered.

A configuration described as one configuration in the foregoing embodiments is not necessarily one configuration. The one configuration may be divided in two or more configurations to implement the functions. For example, the memory may be separated from the parking assist apparatus 3.

Moreover, a plurality of configurations described in the foregoing embodiments are not necessarily the plurality of configurations. The plurality of configurations may be configured as one configuration. For example, at least one camera may be installed in the parking assist apparatus 3 as one configuration. Moreover, the parking assist apparatus 3 and the navigation apparatus 8 may be combined as one configuration.

The server 10 may include a part of a configuration of an apparatus in the vehicle 2 or a part of the configuration of the parking assist apparatus 3. Moreover, the server 10 may performs a part of the functions of the parking assist apparatus 3. For example, the server 10 may determine whether or not the parking operation that the driver is performing is different from the generally-used parking technique or the ideal parking technique.

Moreover, in the foregoing embodiments, the configuration described as hardware may be implemented by software, and a function described as software may be implemented by hardware. Also, a function of hardware or software may be implemented by a combination of software and hardware. Moreover, the combination of software and hardware may be implemented by hardware or software.

While the invention has been shown and described in detail, the foregoing description is in all aspects illustrative and not restrictive. It is therefore understood that numerous other modifications and variations can be devised without departing from the scope of the invention.

What is claimed is:

1. A parking assist apparatus that assists a parking operation to park a vehicle, the parking assist apparatus comprising a microcomputer configured to:
    acquire a parking technique model that shows a parking technique that is determined in accordance with a parking condition of the vehicle;
    determine whether or not an actual parking technique being used by a user of the vehicle to park the vehicle is different from the parking technique shown by the parking technique model by comparing a vehicle direction (forward or backward) and a steering direction (leftward or rightward) of the actual parking technique to the vehicle direction and the steering direction of the parking technique shown by the parking technique model;
    output a question to the user about whether or not assistance for the parking operation is desired to park the vehicle in a case where the actual parking technique of the user is different from the parking technique shown by the parking technique model; and
    provide parking assistance for the parking operation to park the vehicle in a case where the user accepts the assistance for the parking operation.

2. The parking assist apparatus according to claim 1, wherein the microcomputer is further configured to:
    collect the parking technique used by the user to park the vehicle in a parking lot; and
    generate the parking technique model based on the collected parking technique and based on a type of the parking lot in which the parking technique has been performed to park the vehicle.

3. The parking assist apparatus according to claim 2, wherein
    the type of the parking lot is at least a part of the parking condition of the vehicle used to acquire the parking technique model.

4. The parking assist apparatus according to claim 3, wherein
    at least one of a time of a day of parking the vehicle, a number of passengers in the vehicle, a number of pedestrians in the parking lot, a facing direction of a parking space, presence or absence of an oncoming vehicle, presence or absence of a subsequent vehicle and a travelling direction of the vehicle relative to the parking space is also a part of the parking condition of the vehicle used to acquire the parking technique model.

5. A parking assist method of assisting a parking operation to park a vehicle, the parking assist method comprising the steps of:
    (a) a microcomputer of the vehicle acquiring a parking technique model that shows a parking technique that is determined in accordance with a parking condition of the vehicle;
    (b) the microcomputer of the vehicle determining whether or not an actual parking technique being used by a user of the vehicle to park the vehicle is different from the parking technique shown by the parking technique model by comparing a vehicle direction (forward or backward) and a steering direction (leftward or rightward) of the actual parking technique to the vehicle direction and the steering direction of the parking technique shown by the parking technique model;
    (c) the microcomputer of the vehicle outputting a question to the user about whether or not assistance for the parking operation is desired to park the vehicle in a case where the actual parking technique of the user is different from the parking technique shown by the parking technique model; and
    (d) the microcomputer of the vehicle providing parking assistance for the parking operation to park the vehicle in a case where the user accepts the assistance for the parking operation.

6. The parking assist method according to claim 5, further comprising the steps of:
    (e) the microcomputer of the vehicle collecting the parking technique used by the user to park the vehicle in a parking lot; and
    (f) the microcomputer of the vehicle generating the parking technique model based on the collected parking technique collected by the step (e) and based on a type of the parking lot in which the parking technique has been performed to park the vehicle.

7. The parking assist method according to claim 6, wherein
    the type of the parking lot is at least a part of the parking condition of the vehicle used to acquire the parking technique model.

8. The parking assist method according to claim 7, wherein
    at least one of a time of a day of parking the vehicle, a number of passengers in the vehicle, a number of pedestrians in the parking lot, a facing direction of a parking space, presence or absence of an oncoming vehicle, presence or absence of a subsequent vehicle and a travelling direction of the vehicle relative to the parking space is also a part of the parking condition of the vehicle used to acquire the parking technique model.

9. A parking assist system that includes a parking assist apparatus that assists a parking operation to park a vehicle, and a server, wherein
    the parking assist apparatus includes a microcomputer configured to:
        acquire a parking condition with respect to parking the vehicle;
        send the parking condition to the server;
        receive, from the server, a parking technique model showing a parking technique that is determined in accordance with the parking condition;
        determine whether or not an actual parking technique being used by a user of the vehicle to park the vehicle is different from the parking technique shown by the parking technique model by comparing a vehicle direction (forward or backward) and a steering direction (leftward or rightward) of the actual parking technique to the vehicle direction and the steering direction of the parking technique shown by the parking technique model;
        output a question to the user about whether or not assistance for the parking operation is desired to park the vehicle in a case where the actual parking technique of the user is different from the parking technique shown by the parking technique model; and provide parking assistance for the parking operation to park the vehicle in a case where the user accepts the assistance for the parking operation, and the server includes a computer configured to:
collect the parking technique to park the vehicle in a parking lot;
generate the parking technique model based on the collected parking technique and based on a type of the parking lot in which the parking technique has been performed to park the vehicle;
receive the parking condition sent from the parking assist apparatus; and
send, to the parking assist apparatus, the parking technique model in accordance with the parking condition received from the parking assist apparatus.

10. The parking assist system according to claim 9, wherein
the type of the parking lot is at least a part of the parking condition of the vehicle used to acquire the parking technique model.

11. The parking assist system according to claim 10, wherein
at least one of a time of a day of parking the vehicle, a number of passengers in the vehicle, a number of pedestrians in the parking lot, a facing direction of a parking space, presence or absence of an oncoming vehicle, presence or absence of a subsequent vehicle and a travelling direction of the vehicle relative to the parking space is also a part of the parking condition of the vehicle used to acquire the parking technique model.

12. A non-transitory computer-readable recording medium that stores a program to be executed by a computer, the program causing the computer to execute the steps of:
(a) acquiring a parking technique model that shows a parking technique that is determined in accordance with a parking condition of the vehicle;
(b) determining whether or not an actual parking technique being used by a user of the vehicle to park the vehicle is different from the parking technique shown by the parking technique model by comparing a vehicle direction (forward or backward) and a steering direction (leftward or rightward) of the actual parking technique to the vehicle direction and the steering direction of the parking technique shown by the parking technique model;
(c) outputting a question to the user about whether or not assistance for the parking operation is desired to park the vehicle in a case where the actual parking technique of the user is different from the parking technique shown by the parking technique model; and
(d) providing parking assistance for the parking operation to park the vehicle in a case where the user accepts the assistance for the parking operation.

13. The program in the non-transitory computer-readable recording medium according to claim 12, the program causing the computer to further execute the steps of:
(e) collecting the parking technique used by the user to park the vehicle in a parking lot; and (f) generating the parking technique model based on the collected parking technique collected by the step (e) and based on a type of the parking lot in which the parking technique has been performed to park the vehicle.

14. The non-transitory computer-readable recording medium according to claim 13, wherein
the type of the parking lot is at least a part of the parking condition of the vehicle used to acquire the parking technique model.

15. The non-transitory computer-readable recording medium according to claim 14, wherein
at least one of a time of a day of parking the vehicle, a number of passengers in the vehicle, a number of pedestrians in the parking lot, a facing direction of a parking space, presence or absence of an oncoming vehicle, presence or absence of a subsequent vehicle and a travelling direction of the vehicle relative to the parking space is also a part of the parking condition of the vehicle used to acquire the parking technique model.

16. The parking assist apparatus according to claim 1, wherein the microcomputer is further configured to:
after determining that the vehicle is in a parking lot, determine whether the vehicle might require parking assistance for the parking lot based on history information of the vehicle and the parking lot; and
after determining that the parking assistance might be required for the parking lot, acquire the parking technique model.

17. The parking assist method according to claim 5, further comprising the step of:
the microcomputer, after determining that the vehicle is in a parking lot, determining whether the vehicle might require parking assistance for the parking lot based on history information of the vehicle and the parking lot, wherein
after determining that the parking assistance might be required for the parking lot, the microcomputer acquiring the parking technique model.

18. The parking assist system according to claim 9, wherein the microcomputer is further configured to:
after determining that the vehicle is in a parking lot, determine whether the vehicle might require parking assistance for the parking lot based on history information of the vehicle and the parking lot; and
after determining that the parking assistance might be required for the parking lot, send the parking condition to the server to acquire the parking technique model.

19. The non-transitory computer-readable recording medium according to claim 12, the program causing the computer to further execute the step of:
after determining that the vehicle is in a parking lot, determine whether the vehicle might require parking assistance for the parking lot based on history information of the vehicle and the parking lot, wherein
after determining that the parking assistance might be required for the parking lot, acquiring the parking technique model.

* * * * *